United States Patent
Polland et al.

(10) Patent No.: US 7,953,108 B2
(45) Date of Patent: May 31, 2011

(54) MEDIA CONVERTER

(75) Inventors: Joe Polland, Eden Prairie, MN (US);
Manish Kumar Sharma, Eden Prairie, MN (US); Xinkuan Zhou, Eden Prairie, MN (US); Rongfen Xu, Beijing (CN)

(73) Assignee: ADC DSL Systems, Inc., Eden Prairie, MN (US)

( * ) Notice: Subject to any disclaimer, the term of this patent is extended or adjusted under 35 U.S.C. 154(b) by 166 days.

(21) Appl. No.: 12/036,663

(22) Filed: Feb. 25, 2008

(65) Prior Publication Data
US 2008/0205436 A1    Aug. 28, 2008

Related U.S. Application Data

(60) Provisional application No. 60/891,987, filed on Feb. 28, 2007.

(51) Int. Cl.
*H04J 3/22* (2006.01)

(52) U.S. Cl. .................................................. 370/466
(58) Field of Classification Search .............. 370/493, 370/463, 537; 713/400
See application file for complete search history.

(56) References Cited

U.S. PATENT DOCUMENTS

| | | | | |
|---|---|---|---|---|
| 6,584,122 | B1* | 6/2003 | Matthews et al. | 370/493 |
| 6,829,252 | B1* | 12/2004 | Lewin et al. | 370/493 |
| 7,088,742 | B2* | 8/2006 | Oliver et al. | 370/537 |
| 2003/0091061 | A1* | 5/2003 | Oliver et al. | 370/463 |
| 2003/0093703 | A1* | 5/2003 | Oliver et al. | 713/400 |

* cited by examiner

Primary Examiner — Albert T Chou
(74) Attorney, Agent, or Firm — Fogg & Powers LLC

(57) ABSTRACT

A method of using a digital subscriber link unit as a media converter, the method comprising coupling a first signal of a first type to a first port of the digital subscriber link unit, converting the first signal of the first type to a second signal of the second type with the digital subscriber link unit and outputting the second signal of the second type from a second port of the digital subscriber link unit. The first port and the second port are not G.SHDSL ports.

23 Claims, 9 Drawing Sheets

MEDIA CONVERTER

This application is related to co-pending U.S. provisional patent application Ser. No. 60/891,987, filed Feb. 28, 2007 entitled "MEDIA CONVERTER,", hereby incorporated herein by reference. The present application hereby claims priority, under 35 U.S.C. §119(e), to U.S. Provisional Patent Application No. 60/891,987.

This application is related to U.S. patent application Ser. No. 12/036,644 having a title of "MULTIPOINT TO MULTIPOINT OVER G.SHDSL" U.S. patent application Ser. No. 12/036,678 having a title of "CROSS-LINK", both of which are filed on the same date herewith. The applications are hereby incorporated herein by reference.

BACKGROUND

A media converter is a hardware device that converts signals for transmission on one type of media to signals for transmission on another type of media. For example, a media converter can couple a twisted pair media to a coax media or couple twisted pair media to optical fiber media. Communication systems are designed to incorporate media converters in the communication links based on a presumption about the use of the communication system in the future. Where there may be a need to convert media, media converters are inserted into communication links.

In some cases, media converters are inserted into communication links and are not used. This results in a higher cost system with no advantage. In other cases, it is not possible to anticipate all the future requirements of a user and a media convert needs to be inserted into the communication link after the system is up and running. This results in an additional expense of purchasing the media converters and modifying the system.

SUMMARY

In a first embodiment, a method of using a digital subscriber link unit as a media converter, the method comprising coupling a first signal of a first type to a first port of the digital subscriber link unit, converting the first signal of the first type to a second signal of the second type with the digital subscriber link unit and outputting the second signal of the second type from a second port of the digital subscriber link unit. The first port and the second port are not G.SHDSL ports.

In a second embodiment, a media converter comprises a digital subscriber link unit having a plurality of ports of different types including G.SHDSL pairs, a central processing unit positioned in the digital subscriber link unit to receive a user selection and a field programmable gate-array configured to communicatively couple two of the ports, other than the G.SHDSL pairs, based on the user selection.

In a third embodiment, a method of using a digital subscriber link unit as a media converter comprises transceiving a first type of signal at a first non-G.SHDSL port of the digital subscriber link unit, converting one of the first type of signal to a second type of signal or the second type of signal to the first type of signal with the digital subscriber link unit, communicatively coupling the first non-G.SHDSL port with a second non-G.SHDSL port based on a configuration of the digital subscriber link unit and transceiving the second type of signal from the second non-G.SHDSL port of the digital subscriber link unit.

DRAWINGS

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention use a digital subscriber link unit as a media converter. The digital subscriber link unit can be operated as either a digital subscriber link unit or a media converter and can switch from one mode to the other. In this manner, the digital subscriber link units in the communication system provide a dual function for the cost of a single function digital subscriber link.

The media converter functionality is built into a digital subscriber link device providing cost and design advantages to users. A media converter described herein does the required media conversion without a dedicated box, while avoiding complicated and expensive connections. For example, the customer uses the digital subscriber link media converter to enable an Ethernet to G.703 conversion by selection of a media conversion mode and selection of a conversion from an Ethernet to G.703. Without the digital subscriber link media converter described herein, the customer is required to connect two WorldDSL units together via G.SHDSL pairs connected as STU-C and STU-R and to cross connect from Ethernet to G.703. This complex and expense process requires using two line units and sending data over DSL, when the customer only wants to send data locally from Ethernet to G.703.

Figure 1:
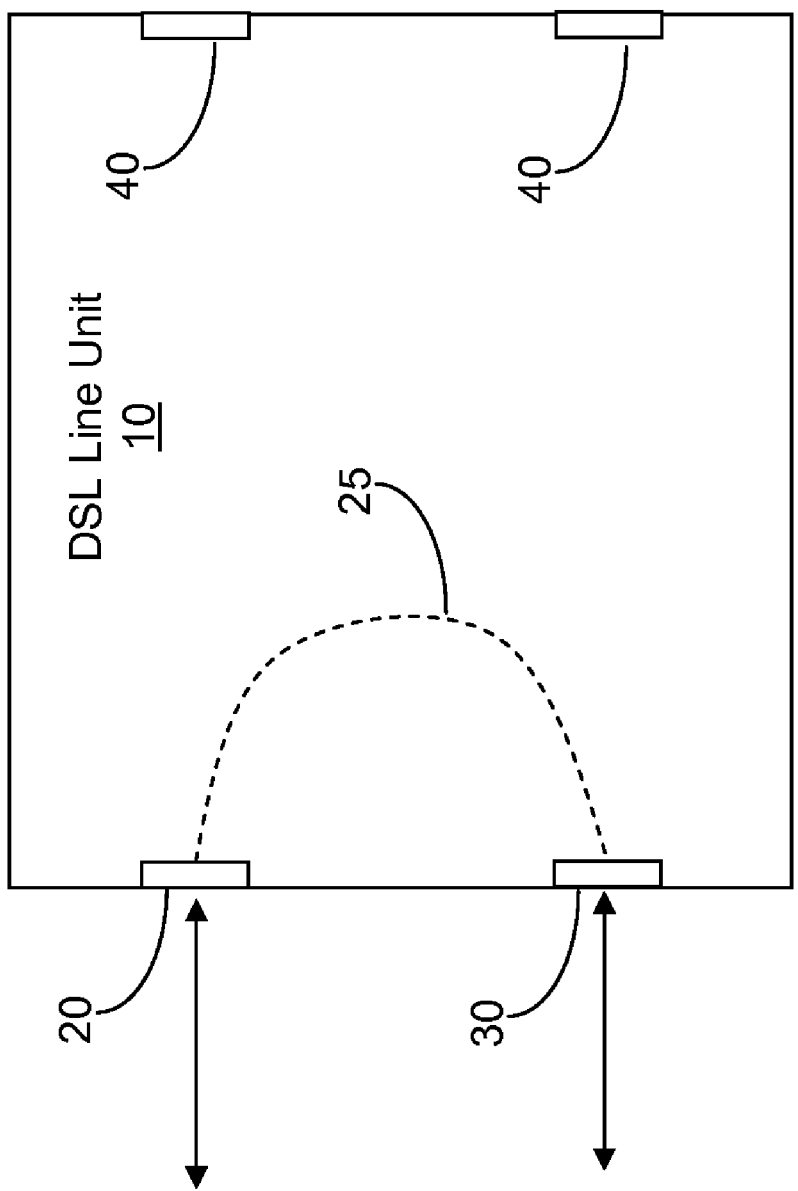
FIG. 1 is a block diagram of one embodiment of a digital subscriber link unit used as a media converter.

FIG. 1 is a block diagram of one embodiment of a digital subscriber link (DSL) unit 10 used as a media converter 10. As used herein, the phrases "media converter 10" and "DSL unit 10" are used interchangeably.

The DSL unit 10 includes two different types of ports of and two G.SHDSL pairs 40. A G.SHDSL pair 40 is two G-type single-paired high speed digital subscriber line ports that terminate on a single connector as known in the art. The first port 20 is communicatively coupled to the second port 30 as indicated by the line 25. Since the first port 20 is not a G.SHDSL pair 40, the first port 20 is also referred to herein as "first non-G.SHDSL port 20." The first port 20 transceives a first type of signal. Since the second port 30 is not a G.SHDSL pair 40, the second port 30 is also referred to herein as "second non-G.SHDSL port 30." The second port 30 transceives a second type of signal.

The first type of port and the second type of port are different from each other and are each selected from a port configured according to G.703 standards in a structured or unstructured mode, a port configured according to Nx64k standards, and a port configured according to Ethernet standards.

G.703 is an International Telecommunication Union Telecommunication (ITU-T) standard for transmitting voice or data over digital carriers such as T1 and E1. G.703 provides the specifications for pulse code modulation. In one implementation of this embodiment, G.703 is sent over balanced 120 ohm twisted pair cables terminated in RJ-45 jacks.

Figure 2:
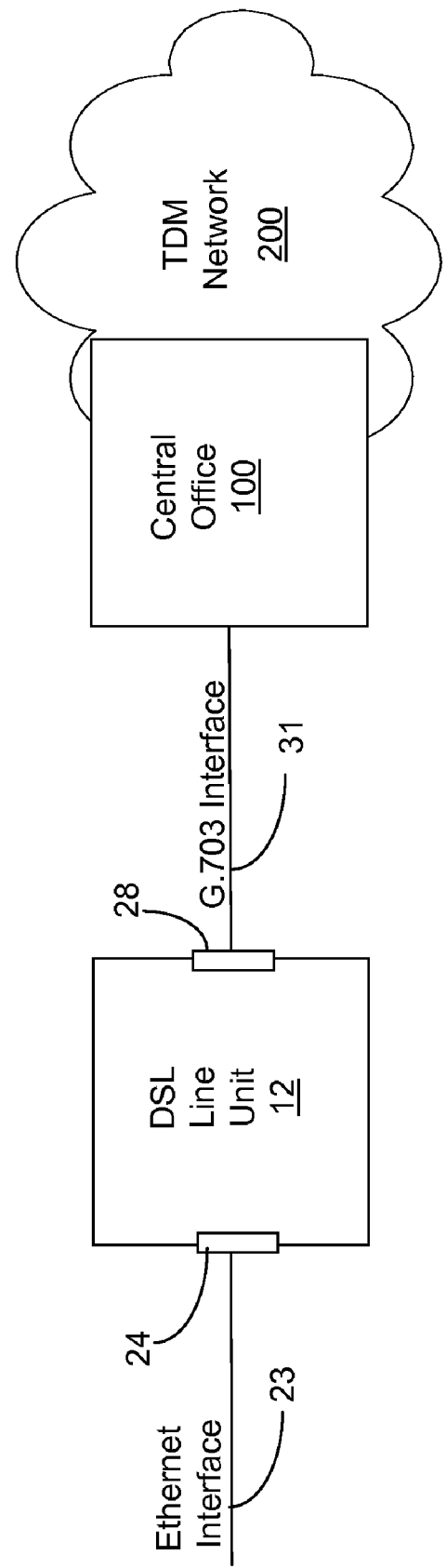
FIG. 2 is a block diagram of one embodiment of a media converter being implemented with a time division multiplexing network.

FIG. 2 is a block diagram of one embodiment of a media converter 10 being implemented with a time division multiplex (TDM) network 200. In this exemplary implementation, the first port 24 is an Ethernet type of port that is coupled to the Ethernet interface 23. The second port 28 is a G.703 type of port, either structured or unstructured, that is coupled to the G703 interface 31. Using this configuration, the Ethernet frames are transported within a G.703 frame to a central office 100. The central office 100 is communicatively coupled to a TDM network 200. In this manner, the G.703 frames are transported to remote locations in the TDM network 200.

Figure 3A:
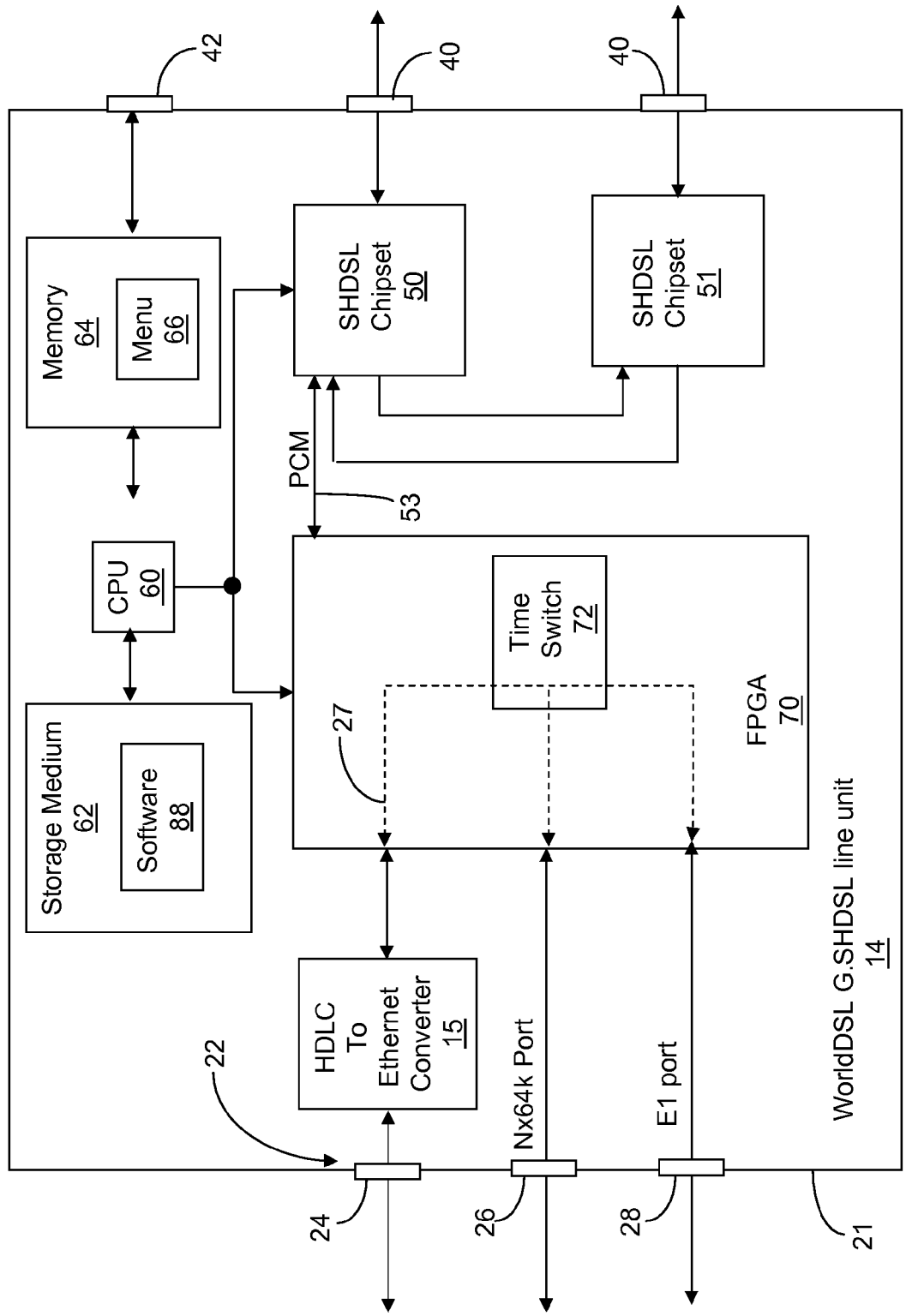
FIG. 3A is a block diagram of one embodiment of a media converter.

FIG. 3A is a block diagram of one embodiment of a media converter 14. As used herein, the phrases "media converter 14" and "WorldDSL G.SHDSL line unit 14" are used interchangeably.

The media converter 14 includes a plurality of different types of ports represented generally by the numeral 22. Specifically, there are three user interface ports 22 on the user interface side 21 and two G.SHDSL pairs 40. The input from the G.SHDSL pairs 40 is sent to a respective SHDSL chipset 50 or 51. The SHDSL chipsets 50 and 51 are coupled in a cascaded configuration. A pulse code modulation interface 53 couples the SHDSL chipset 50 to the FPGA 70. When the WorldDSL G.SHDSL line unit 14 is implemented as the media converter 14, the G.SHDSL pairs 40 are not used.

The plurality of ports 22 and the G.SHDSL pairs 40 are connected via the SHDSL chipset 50 and a custom field programmable gate array (FPGA) 70. When the WorldDSL G.SHDSL line unit 14 is used as a media converter 14, one of the plurality of ports 22 is used as the first port 20 (FIG. 1) while another of the plurality of ports 22 is used as the second port 30 (FIG. 1). Thus, the term "first port 20" is generic for one of the plurality of ports 22 being used as the first port and the term "second port 30" is generic for one of the others of the plurality of ports 22 being used as the second port.

The FPGA 70 and the G.SHDLS chipsets 50 are controlled by the central processing unit 60, which is responsible for configuration, status and error handling of the WorldDSL G.SHDSL line unit 14. The FPGA 70 is the functional block responsible for connecting the plurality of ports 22. The FPGA 70 handles timeslot allocation, and switching of timeslots between the plurality of ports 22. A time switch 72 controls the time slot allocation as directed by the central processing unit 60. The plurality of ports 22 include an E1 or T1 port 28 (also referred to herein as a G.703 port 28), an Nx64k port 26, and a 10/100 Base-T Ethernet port 24. The 10/100 Base-T Ethernet port 24 is also referred to herein as an Ethernet port 24. An HDLC-to-Ethernet converter 15 is inline with the Ethernet port 24 to provide high-level data link control (HDLC) encoding/decoding. When Ethernet frames are received at the Ethernet port 24, the HDLC-to-Ethernet converter 15 receives Ethernet frames after sync bytes and the start of frame byte are removed. HDLC-to-Ethernet converter 15 modifies the stripped-Ethernet frame for updated HDLC encoding in order to output timeslots via line 27 to one of the other ports 26 or 28.

Likewise, when Ethernet frames are transmitted from the Ethernet port 24, the HDLC-to-Ethernet converter 15 receives timeslots from on of the other ports 26 or 28 via line 27 and modifies the received timeslots for HDLC decoding in order to output (stripped) Ethernet frames.

Figure 3B:
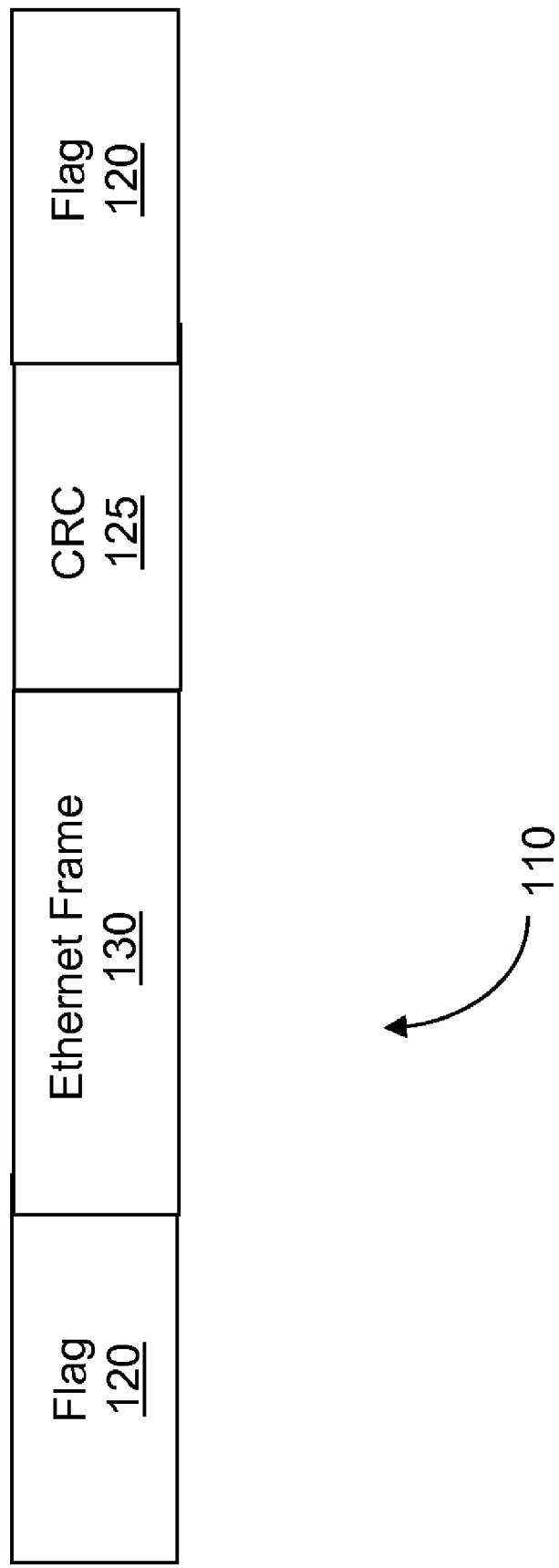
FIG. 3B shows on embodiment of the data structure of the high-level data link control encoding.

FIG. 3B shows one embodiment of the data structure 110 of the HDCL encoding. The data structure 110 includes the flag 120 which is one binary byte 01111110. The cyclic redundancy check (CRC) 125 is 16 bits long and is created using the polynomial $X^{16}+X^{12}+X^5+1$. The Ethernet frame 130 and the cyclic redundancy check 125 are bitwise checked. If a contiguous sequence of five ones (11111) are found, a zero is inserted so that no pattern between the start of the Ethernet frame 130 and the end of cyclic redundancy check 125 can resemble a flag (01111110). This prevents erroneous detection of flags within the Ethernet frame 130 or cyclic redundancy check 125.

The E1 port 28 is configured in structured or unstructured mode. In the unstructured mode, the E1 port 28 operates as a 2 Mbits/sec unframed interface. In structured mode, the E1 port 28 operates as a G.703 framed signal interface.

The Nx64k port 26 is a timeslot based data port, which is configured with rates up to 178 timeslots. Nx64k is a generic term and the Nx64k port 26 may be configured according to V.35, V.36, X.21, or RS-530 standards.

The Ethernet port 24 is either full or half duplex and is configured using auto negotiation and auto (MDI)/MDI-x cable detection, eliminating the need for crossover cables. In one implementation of this embodiment, the Ethernet port 24 is manually configured.

A user selects a mode of operation for the WorldDSL G.SHDSL line unit 14, and the first and second ports from a menu 66 via a user interface 42. In one implementation of this embodiment, the user also selects a data rate for transceived signals from a menu 66 via a user interface 42. When the WorldDSL G.SHDSL line unit 14 operates as a media converter 14, two of the plurality of ports 22 are selected as the first port 20 and the second port 30 (FIG. 1). The selection of first port 20 and second port 30 is provided by a user via the user interface 42. The dashed double-ended arrows indicate the lines 27 within the FPGA 70 available to communicatively couple the first port 20 and the second port 30. In one implementation of this embodiment, the lines 27 are conductive trace lines. In another implementation of this embodiment, the lines 27 are conductive wires. As shown in FIG. 1, once the first port 20 and the second port 30 are selected, the lines 25, which are a subset of the lines 27, are used to communicatively couple the first port 20 with the second port 30.

The time switch 72 in the line between the first port 20 and the second port 30 is initialized by the central processing unit 60 based on the types of ports selected so that a selected data rate is accommodated by the media converter 14. A selection of data rate is provided by a user via the user interface 42.

The central processing unit 60 is communicatively coupled to a memory 64, which stores the menu 66 that includes the options for the data rate selection and the first and second port selection. The central processing unit 60 is communicatively coupled to a storage medium 62. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

The central processing unit 60 executes software 88 and/or firmware that causes the central processing unit 60 to perform at least some of the processing described here as being performed during methods 400-800 as described above with reference to FIGS. 4-8, respectively. At least a portion of such software 88 and/or firmware executed by the central processing unit 60 and any related data structures are stored in storage medium 62 during execution. Memory 64 comprises any suitable memory now known or later developed such as, for example, random access memory (RAM), read only memory (ROM), and/or registers within the central processing unit 60. In one implementation, the central processing unit 60 comprises a microprocessor or microcontroller. Moreover, although the central processing unit 60 and memory 64 are shown as separate elements in FIG. 3A, in one implementation, the central processing unit 60 and memory 64 are implemented in a single device (for example, a single integrated-circuit device). The software 88 and/or firmware executed by the central processing unit 60 comprises a plurality of program instructions that are stored or otherwise embodied on a storage medium 62 from which at least a portion of such program instructions are read for execution by the central processing unit 60. In one implementation, the central processing unit 60 comprises processor support chips and/or system support chips such as ASICs.

Figure 4:
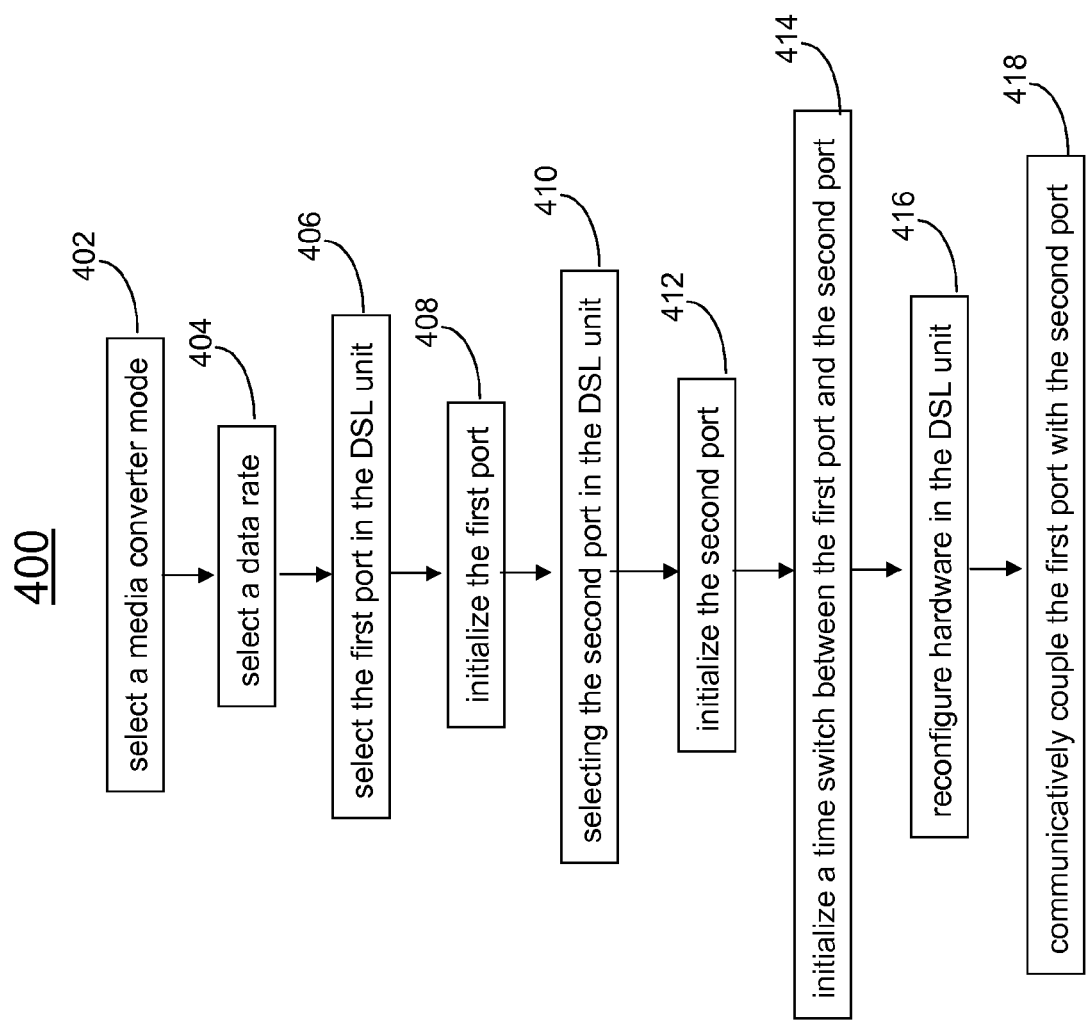
FIG. 4 is a flow diagram of one embodiment of a method to configure a digital subscriber link unit for use as a media converter.

FIG. 4 is a flow diagram of one embodiment of a method 400 to configure a digital subscriber link unit 11 for use as a media converter. Method 400 is described with reference to FIGS. 1 and 3.

The method 400 begins when a user selects a media-converter mode to initiate a reconfiguration process of the WorldDSL G.SHDSL line unit 14 (402). At least two system modes, digital-subscriber-link mode and media-converter mode, are available for selection in the menu 66. A user selects the media-converter mode by providing a user input indicative of the media-converter mode via the user interface 42. Then the media-converter mode is initiated and the central processing unit 60 reconfigures the digital subscriber link unit 14 to operate as a media converter 14.

A user selects a data rate (404). The user provides a user input indicative of the data rate for transceived signals via the user interface 42. In one implementation of this embodiment, the user input is selected from a plurality of data rates that are included in the menu 66.

A user selects the first port 20 in the digital subscriber link unit 14 (406) after selecting the media-converter mode. In one implementation of this embodiment, a menu 66 including first port selections is automatically provided to the user responsive to receiving the user input indicative of the media-converter mode. A user input indicative of the first port 20 is via user interface 42. Once the first port 20 is selected, the central processing unit 60 initializes the selected first port 20 so the first port 20 is enabled to transceive the first type of signal (408). When the WorldDSL G.SHDSL line unit 14 is operating as a media converter 14, the G.SHDSL pairs 40 are not used.

A user selects the second port 30 in the digital subscriber link unit 14 (410) responsive to selecting the media-converter mode.

In one implementation of this embodiment, a menu 66 including second port selections is automatically provided to the user responsive to receiving the user input indicative of the media-converter mode and the first port. In another implementation of this embodiment, a menu 66 including first port selections and second port selections is automatically provided to the user responsive to receiving the user input indicative of the media-converter mode. In one implementation of this case, the user selects the first port 20 and the second port 30 by selecting a box in Table 1.

Table 1 shows one embodiment of the menu 66 for the selection of the first port 20 and the second port 30. The first ports 20 are listed in the first row of Table 1 and the second ports 30 are listed in the first column of Table 1. Since the first port 20 is different from the second port 30, the selections of same type of first port and second port is prohibited as shown by the word "NO." The user selects one of the boxes labeled "YES" to simultaneously select the first port 20 and the second port 30.

TABLE 1

|  | 1st port | | |
| --- | --- | --- | --- |
| 2nd port | G.703 | Nx64k | Ethernet |
| G.703 | NO | YES | YES |
| Nx64k | YES | NO | YES |
| Ethernet | YES | YES | NO |

Once the second port 30 is selected, the central processing unit 60 initializes the selected so the second port is enabled to transceive the second type of signal (412).

The central processing unit 60 initializes the time switch 72 communicatively coupled between the first port and the second port on line 26 based on receiving the selected data rate (414). The central processing unit 60 reconfigures the hardware in the digital subscriber link unit 14 (416) based on the type of the first port 20 and the type of the second port 30. The selected first port 20 is communicatively coupled with the selected second port 30 based on the configurations.

In this manner, the user selection specifies a first type of port, a second type of port different from the first type of port, and a data rate. The central processing unit 60 initializes the first port 20 of the first type and the second port 30 of the second type and configures the field programmable gate-array 70 to communicatively couple the first port 20 to the second port 30.

In one implementation of this embodiment, the first port 20 is Ethernet port 24 and it is communicatively coupled to the second port 30, which is Nx64k port 26 (FIG. 3A). In another implementation of this embodiment, the first port 20 is Ethernet port 24 and it is communicatively coupled to the second port 30, which is G.703 port 28. In yet another implementation of this embodiment, the first port 20 is the Nx64k port 26 and it is communicatively coupled to the second port 30, which is the G.703 port 28. In yet another implementation of this embodiment, the first port 20 is the Nx64k port 26 and it is communicatively coupled to the second port 30, which is the Ethernet port 24. In yet another implementation of this embodiment, the first port 20 is the G.703 port 28 and it is communicatively coupled to the second port 30, which is the Ethernet port 24. In yet another implementation of this embodiment, the first port 20 is the G.703 port 28 and it is communicatively coupled to the second port 30, which is the Nx64k port 26.

Figure 5:
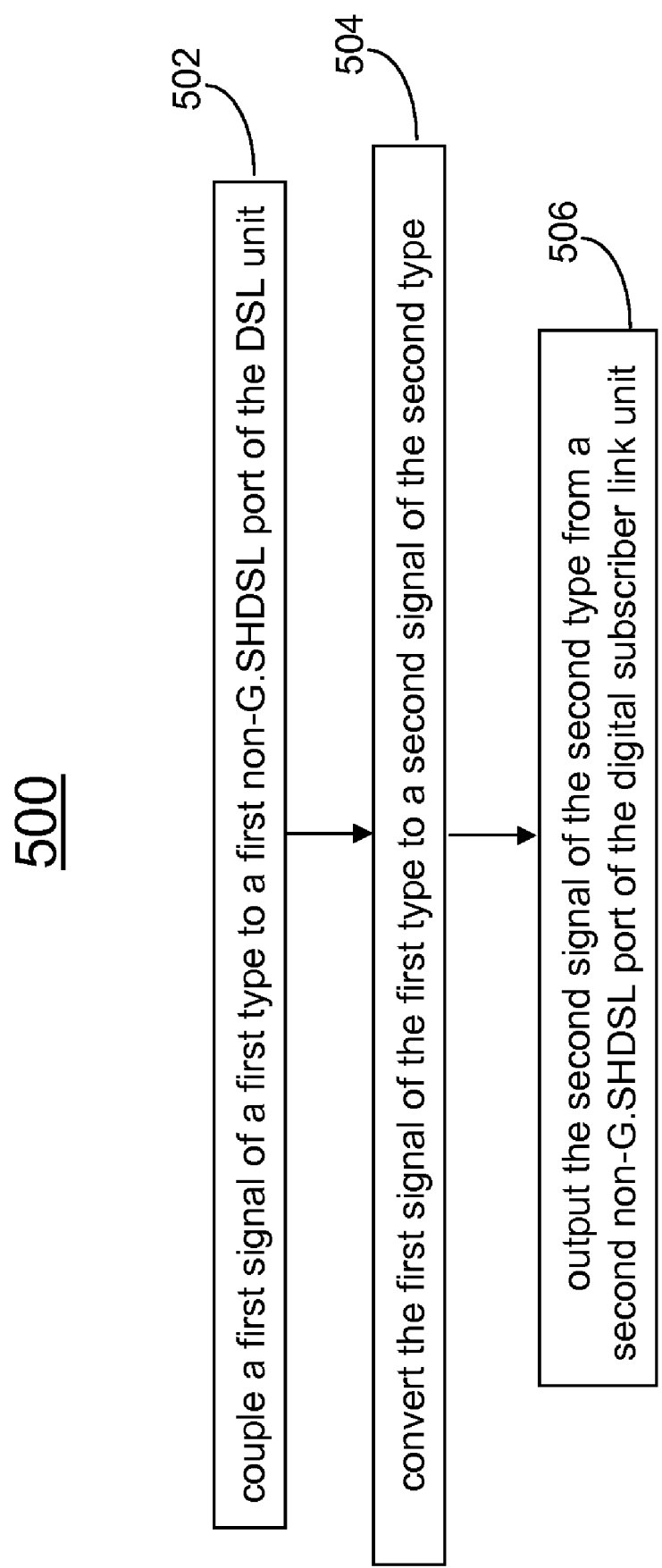
FIG. 5 is a flow diagram of one embodiment of a method of using a digital subscriber link unit as a media converter.

FIG. 5 is a flow diagram of one embodiment of a method 500 of using a digital subscriber link unit 14 as a media converter 14. Method 500 is described with reference to FIGS. 1 and 3. The method 500 begins by coupling a first signal of a first type to a first non-G.SHDSL port of the digital subscriber link unit (502). The first signal of the first type is converted to a second signal of the second type with the digital subscriber link unit 14 (504). The second signal of the second type is output from the non-G.SHDSL second port 30 of the digital subscriber link unit 14 (506).

Figure 6:
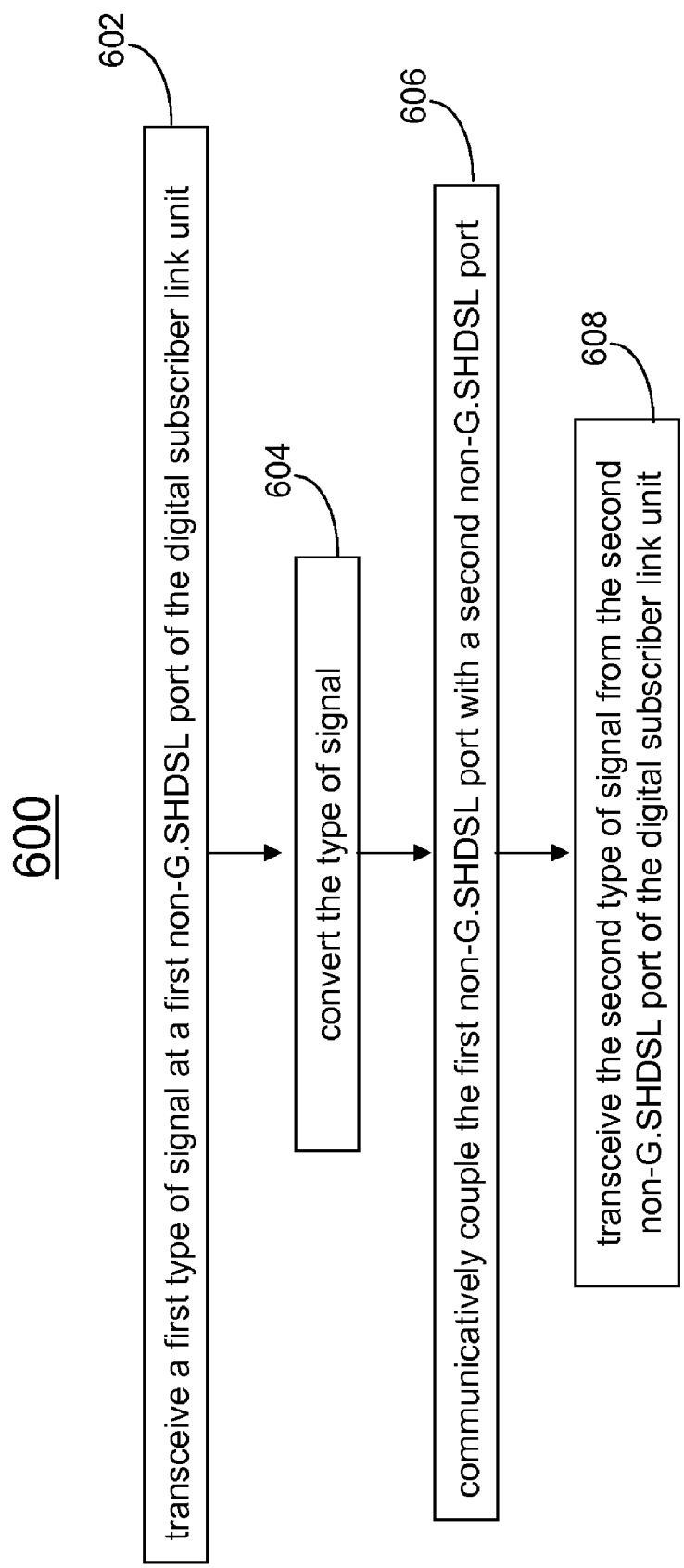
FIG. 6 is a flow diagram of one embodiment of a method of bi-directionally operating a digital subscriber link unit as a media converter.

FIG. 6 is a flow diagram of one embodiment of a method 600 of bi-directionally operating a digital subscriber link unit 10 as a media converter 10. Method 600 is described with reference to FIGS. 1 and 3, in which the digital subscriber link unit 10 of FIG. 10 is similar in function and structure to the WorldDSL G.SHDSL line unit 14 of FIG. 3A.

The method 600 begins when a first type of signal is transceived at a first non-G.SHDSL port 20 of the digital subscriber link unit 10 (602). Transceived is defined herein as transmitted and/or received. Each of the plurality of ports 22 in FIG. 3A is operable to both transmit and receive signals.

If the signal is received at the non-G.SHDSL first port 20 (FIG. 1) of the digital subscriber link unit 10, the received signal is a first type of signal. The first type of signal is converted to the second type of signal (604). If the signal is transmitted from the first non-G.SHDSL port 20 of the digital subscriber link unit 10, the transmitted signal is the first type of signal. The transmitted signal was converted to a first type of signal from the second type of signal before it was sent from the non-G.SHDSL first port 20. Thus, the first type of signal is converted to a second type of signal or the second type of signal is converted to the first type of signal with the digital subscriber link unit 10 (604).

The first non-G.SHDSL port is communicatively coupling with a non-G.SHDSL second port 30 (FIG. 1) based on a configuration of the digital subscriber link unit (606). The second type of signal is transceived from the second non-G.SHDSL port 30 of the digital subscriber link unit 10 (608). Thus, a signal received at a first non-G.SHDSL port 20 is converted and sent to a communicatively coupled second non-G.SHDSL port 30. The second non-G.SHDSL port 30 transmits the converted signal. Likewise, a signal received at the second non-G.SHDSL port 30 is converted and sent to the communicatively coupled first non-G.SHDSL port 20. The communicatively coupled first non-G.SHDSL port 20 transmits the converted signal.

The manner in which the first type of signal is converted to the second type of signal depends on the types of signals. Exemplary conversion processes are described below with reference to FIGS. 7 and 8.

Figure 7:
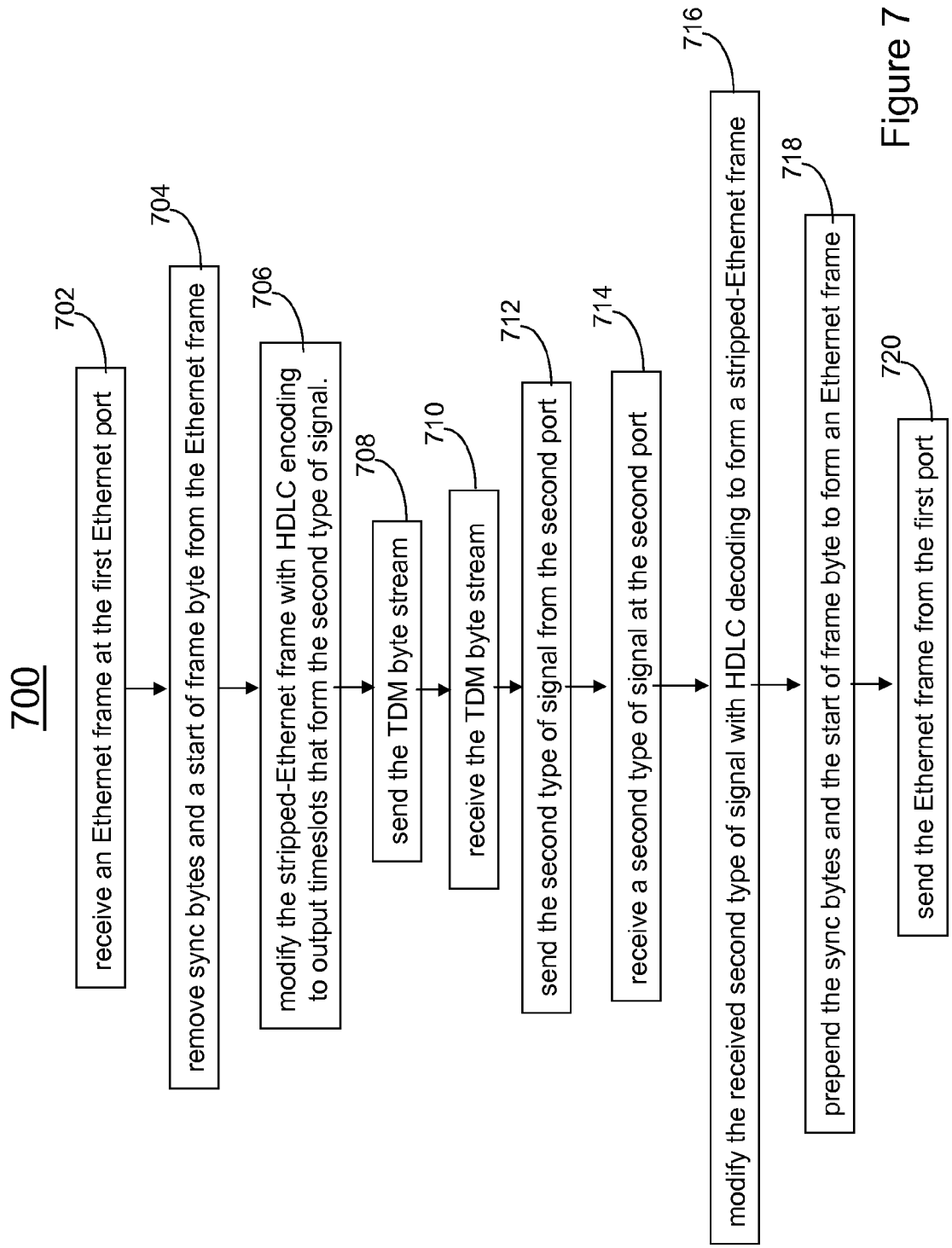
FIG. 7 is a flow diagram of one embodiment of a method of converting an Ethernet signal in a WorldDSL G.SHDSL line unit used as a media converter.

FIG. 7 is a flow diagram of one embodiment of a method 700 of converting an Ethernet signal in a WorldDSL G.SHDSL line unit 14 used as a media converter 14. Method 700 begins by receiving an Ethernet frame at the first port (702). The first port 20 is an Ethernet port 24 and the first signal is an Ethernet signal comprising an Ethernet frame. The sync bytes and the start of frame byte are removed from the Ethernet frame to form a stripped-Ethernet frame (704). HDLC-to-Ethernet converter 15 modifies the stripped-Ethernet frame with HDLC encoding to output timeslots that form the second type of signal. (706). The HDLC-to-Ethernet converter 15 outputs timeslots, which are inserted into a TDM byte stream. The TDM byte stream is sent from the first port 20 to the second port 30 (708). The TDM byte stream is received at the second port 30 (710).

The signal of the second type is sent from the second port 30 (712). In one implementation of this embodiment, the second port 30 is the Nx64k port 26 and the second type of signal is sent from the Nx64k port 26. In another implementation of this embodiment, the second port 30 is the G.703 port 28 and the second signal is a G.703 frame sent from the G.703 port 28.

The media converter 14 provides bi-directional transmission and a signal of the second type is received at the second port 30 (714). In this exemplary embodiment, the signals received at the second port 30 are sent to the Ethernet port 24. The signals received at the second port 30 are passed through the HDLC-to-Ethernet converter 15 before reaching the Ethernet port 24. The HDLC-to-Ethernet converter 15 modifies the received second type of signal with HDLC decoding in order to form a stripped-Ethernet frame (716). The HDLC-to-Ethernet converter 15 receives timeslots as a TDM byte stream and generates the Ethernet frame without the sync bytes and the start of frame byte. The sync bytes and the start of frame byte are prepended to the stripped-Ethernet frame to form an Ethernet frame (718). The Ethernet frame is sent from the Ethernet port 24 (720).

Figure 8:
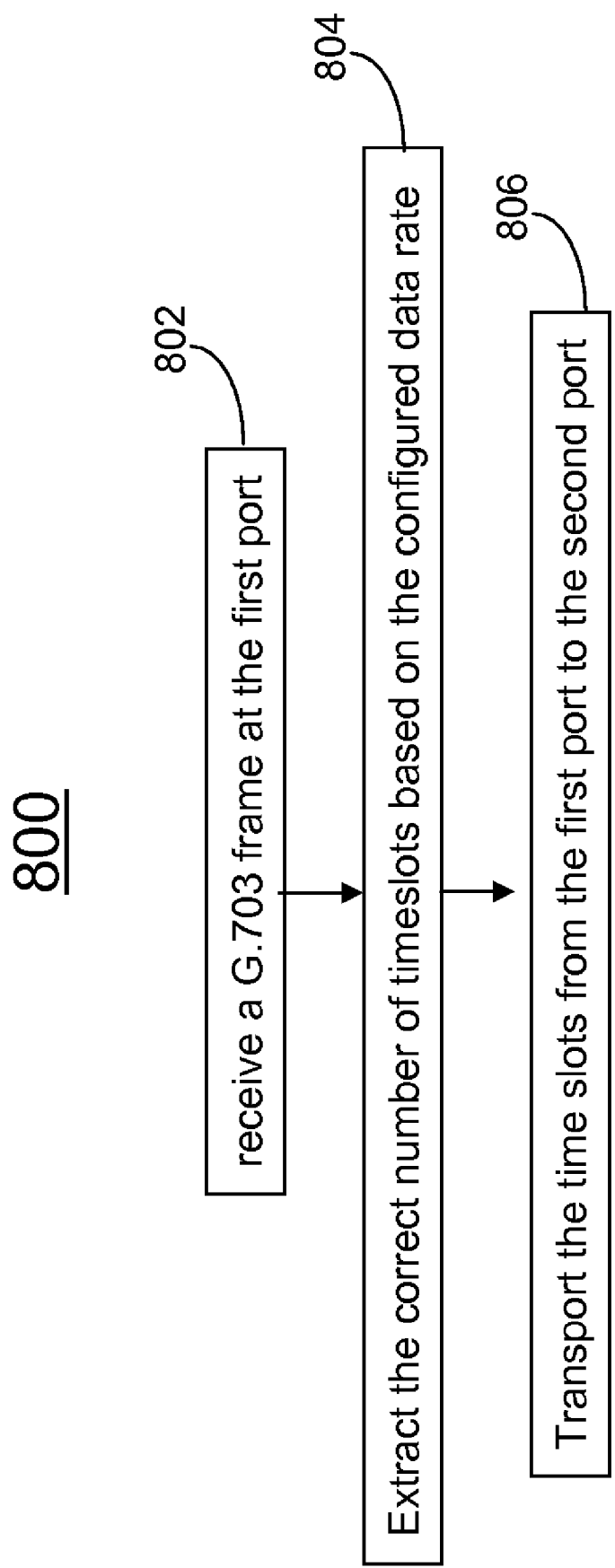
FIG. 8 is a flow diagram of one embodiment of a method of converting a G.703 signal in a WorldDSL G.SHDSL line unit used as a media converter.

FIG. 8 is a flow diagram of one embodiment of a method 800 of converting a structured mode G.703 signal in a WorldDSL G.SHDSL line unit 14 used as a media converter 14. Method 800 begins by receiving a G.703 frame at the first port (802). Using the configured data rate, the correct number of timeslots are extracted based on the configured data rate of the G.703 port (804). This may include timeslot 16, depending on the data rate. The signaling is disabled in timeslot 16 in this application and timeslot 16 can carry data. The number of timeslots depends on the selected data rate as described above with reference to step 414 of method 400 in FIG. 4. The timeslots are transported from the first port 20 to the second port 30 (806) via the time switch 72 (FIG. 3A). In one implementation of this embodiment, the second port 30 is Nx64, and the timeslots are inserted into Nx64 signal and transmitted to the second port 30. In another implementation of this embodiment, the second port 30 is an Ethernet port. In this case, timeslots are transported to the HDLC-to-Ethernet converter 15 prior to being sent from the second port 30. The HDLC-to-Ethernet converter 15 removes the HDLC encoding leaving an Ethernet frame. Start of frame (SOF) byte and sych bytes are added before the frame is transmitted on the Ethernet port.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method of using a digital subscriber link unit as a media converter, the method comprising:
   coupling a first signal of a first type to a first port of the digital subscriber link unit, wherein the first port is one of a G.703 port, a Nx64k port, and an Ethernet port;
   converting the first signal of the first type to a second signal of the second type with the digital subscriber link unit; and
   outputting the second signal of the second type from a second port of the digital subscriber link unit, wherein the second port differs in type from the first port, and is one of a G.703 port, a Nx64k port, and an Ethernet port, wherein the digital subscriber link unit also includes G.SHDSL ports, which are unused while the digital subscriber link unit functions as the media converter, and wherein the digital subscriber link unit is operable to switch between operating in a digital-subscriber-link mode and operating in a media-converter mode.

2. The method of claim 1, further comprising:
coupling a second signal of the second type to the second port of the digital subscriber link unit;
converting the second signal of the second type to a first signal of the first type with the digital subscriber link unit; and
outputting the first signal of the first type from the first port of the digital subscriber link unit.

3. The method of claim 1, further comprising:
selecting the media-converter mode to initiate a reconfiguration process of the digital subscriber link unit; and
operating the digital subscriber link unit as the media converter.

4. The method of claim 3, further comprising:
selecting the first port in the digital subscriber link unit responsive to selecting the media-converter mode, wherein the first port is configured to tranceive the first type of signal;
selecting the second port in the digital subscriber link unit, responsive to selecting the media-converter mode, wherein the second port is configured to tranceive the second type of signal; and
communicatively coupling the first port with the second port based on the configurations.

5. The method of claim 4, further comprising:
selecting a data rate.

6. The method of claim 5, wherein communicatively coupling the first port to the second port comprises:
initializing a time switch between the first port and the second port based on receiving the selected data rate.

7. The method of claim 5, wherein selecting a data rate comprises:
providing a plurality of data rates in a menu; and
receiving a user input at the menu to select the media-converter mode from the menu.

8. The method of claim 4, wherein communicatively coupling the first port to the second port comprises:
initializing the first port based on selecting the first port; and
initializing the second port based on selecting the second port.

9. The method of claim 8, wherein communicatively coupling the first port to the second port further comprises:
reconfiguring hardware in the digital subscriber link unit based on a first type of the first port and a second type of the second port.

10. The method of claim 4, wherein selecting the first port in the digital subscriber link unit comprises:
providing a selection of first ports in a menu; and
receiving a user input at the menu to select the first port from the menu.

11. The method of claim 4, wherein selecting the second port in the digital subscriber link unit comprises:
providing a selection of second ports in a menu; and
receiving a user input at the menu to select the second port from the menu.

12. The method of claim 3, wherein selecting the media-converter mode comprises:

providing at least two system modes in a menu, wherein the at least two system modes comprise the digital-subscriber-link mode and the media-converter mode; and
receiving a user input at the menu to select the media-converter mode from the menu.

13. The method of claim 2, wherein converting the first signal of the first type to a second signal of the second type with the digital subscriber link unit comprises:
receiving an Ethernet frame at the first port, wherein the first port is an Ethernet port and the first type is Ethernet;
removing sync bytes and a start of frame byte from the Ethernet frame to form a stripped-Ethernet frame; and
modifying the stripped-Ethernet frame with high-level data link control (HDLC) encoding to output timeslots that form the second type of signal.

14. The method of claim 13, wherein converting the second signal of the second type to a first signal of the first type with the digital subscriber link unit comprises:
receiving a second type of signal at the second port;
modifying the received second type of signal with high-level data link control (HDLC) decoding to form a stripped-Ethernet frame;
prepending the sync bytes and the start of frame byte to the stripped-Ethernet frame to form an Ethernet frame; and
sending the Ethernet frame from the first port.

15. The method of claim 14, wherein the signal of a second type is one of a G.703 signal and an Nx64k signal.

16. The method of claim 1, wherein converting the first signal of the first type to a second signal of the second type with the digital subscriber link unit comprises:
receiving a G.703 frame at the first port, wherein the first port is a G.703 port and the first type is G.703 configured in structured mode;
extracting the correct number of timeslots based on a configured data rate of the G.703 port; and
transporting the time slots from the first port to the second port.

17. A media converter, comprising:
a digital subscriber link unit having a plurality of ports of different types including G.SHDSL pairs, wherein the digital subscriber link unit is operable to switch between operating in a digital-subscriber-link mode and operating in a media-converter mode;
a central processing unit positioned in the digital subscriber link unit to receive a user selection to select operation of the digital subscriber link unit in one of the digital-subscriber-link mode and the media-converter mode; and
a field programmable gate-array configured to communicatively couple two of the ports, other than the G.SHDSL pairs, based on the user selection of the media-converter mode, wherein the G.SHDSL pairs are unused while the digital subscriber link unit functions as the media converter.

18. The media converter of claim 17, wherein the user selection specifies a first type of port, a second type of port different from the first type of port, and a data rate, wherein the central processing unit is configured to initialize a first port of the first type, and a second port of the second type, and wherein the field programmable gate-array is configured to communicatively couple the first port to the second port.

19. The media converter of claim 18, wherein the first type of port is selected from a port configured according to G.703 standards for structured mode, a port configured according to G.703 standards for unstructured mode, a port configured according to Nx64k standards, and a port configured according to Ethernet standards, and wherein the second type of port is selected from a port configured according to G.703 standards for structured mode, a port configured according to G.703 standards for unstructured mode, a port configured according to Nx64k standards, and a port configured according to Ethernet standards.

20. The media converter of claim 19, wherein one of the first port and the second port is configured according to G.703 standards for structured mode.

21. The media converter of claim 18, further comprising:
a time switch between the first port and the second port, wherein the central processing unit is further configured to initialize the time switch based on the first type and the second type.

22. A method of using a digital subscriber link unit as a media converter, the method comprising:
transceiving a first type of signal at a first non-G.SHDSL port of the digital subscriber link unit, wherein the first port is one of a G.703 port, a Nx64k port, and an Ethernet port;
converting one of the first type of signal to a second type of signal or the second type of signal to the first type of signal with the digital subscriber link unit;
communicatively coupling the first non-G.SHDSL port with a second non-G.SHDSL port based on a configuration of the digital subscriber link unit, wherein the second port differs in type from the first port, and is one of a G.703 port, a Nx64k port, and an Ethernet port; and transceiving the second type of signal from the second non-G.SHDSL port of the digital subscriber link unit while the digital subscriber link unit operates in a media-converter mode, wherein the digital subscriber link unit also includes G.SHDSL ports, which are unused while the digital subscriber link unit operates in the media converter-mode, and wherein the digital subscriber link unit is operable to switch from the media converter-mode to a digital-subscriber-link mode.

23. The method of claim 22, further comprising:
selecting the media-converter mode to initiate a reconfiguration process of the digital subscriber link unit;
operating the digital subscriber link unit as the media converter;
selecting the first port in the digital subscriber link unit responsive to selecting the media-converter mode, wherein the first port is configured to transceive the first signal;
selecting the second port in the digital subscriber link unit, responsive to selecting the media-converter mode, wherein the second port is configured to transceive the second signal; and
selecting a data rate responsive to selecting the media-converter mode and based on the selected first port and second port.

* * * * *